United States Patent
DuHadway et al.

(10) Patent No.: US 8,688,716 B1
(45) Date of Patent: Apr. 1, 2014

(54) RECOMMENDING PAIRWISE VIDEO COMPARISONS TO IMPROVE RANKING

(75) Inventors: Charles DuHadway, Sunnyvale, CA (US); Luca de Alfaro, Mountain View, CA (US)

(73) Assignee: Google Inc., Mountain View, CA (US)

( * ) Notice: Subject to any disclaimer, the term of this patent is extended or adjusted under 35 U.S.C. 154(b) by 67 days.

(21) Appl. No.: 13/525,219

(22) Filed: Jun. 15, 2012

(51) Int. Cl.
*G06F 7/00* (2006.01)
*G06F 17/30* (2006.01)

(52) U.S. Cl.
USPC ............. 707/748; 707/719; 707/759; 725/46; 725/92

(58) Field of Classification Search
None
See application file for complete search history.

(56) References Cited

U.S. PATENT DOCUMENTS

| | | | |
|---|---|---|---|
| 2007/0174385 A1* | 7/2007 | DuFour | 709/203 |
| 2008/0154889 A1* | 6/2008 | Pfeiffer | 707/5 |
| 2011/0246440 A1* | 10/2011 | Kocks et al. | 707/706 |

OTHER PUBLICATIONS

Youtube, LLC, "Introducing YouTube Slam," Dec. 27, 2011, 4 pages, [online] [retrieved on Jan. 8, 2013] Retrieved from the internet <URL:http://youtube-global.blogspot.com/2011/12/introducing-youtube-slam.html>.

* cited by examiner

*Primary Examiner* — Loan T Nguyen
(74) *Attorney, Agent, or Firm* — Fenwick & West LLP

(57) ABSTRACT

A ranking system is described for adjusting quality distributions of items responsive to pairwise comparisons. The pairwise comparisons are selected for a user providing a preference between the items in the pairwise comparisons. The selection is determined based on the cost of an error in the rankings of items in combination with the likelihood there is an error in the item rankings. On receiving the comparison result from the user, the quality distributions are updated and can include a confidence modifier to determine the confidence the user's preference is reflective of the actual preference between the items.

18 Claims, 4 Drawing Sheets

RECOMMENDING PAIRWISE VIDEO COMPARISONS TO IMPROVE RANKING

BACKGROUND

1. Field of Art

The present disclosure generally relates to a system for ranking items and identifying individual item comparisons to improve item rankings.

2. Background

Internet contests are often held to find the "best" of something, using user inputs to identify and rank various items to find a winner. Typically the winner is chosen using a tournament-style bracket or by tallying votes for each item. Such contests may be useful for a limited number of items (e.g., 1000 or less), but do not practically scale to a large number of items (e.g., 100,000) or where user votes are scarce relative to the number of items. For example, fairly determining the "funniest" video on a video repository such as YOUTUBE™ with thousands of entries is a difficult endeavor. In addition, current methods do not have effective means to quickly rate new entrants in a way that finds the likely ranking of the new entrant.

SUMMARY

A video ranking module in one embodiment is provided for improving ranking of videos using a quality distribution histogram. Videos in a plurality of videos are associated with quality distribution histograms. Using the quality distribution histogram, the videos are ranked. A cost is calculated for pairwise video comparisons, the cost based on a cost if the ranking is incorrect and the probability that the ranking is incorrect. Using the costs for pairwise video comparisons, a comparison pair is provided to a user for the user to compare the videos. In an embodiment, the video ranking module receives a comparison result for a pair of videos and updates the quality distribution to reflect the comparison.

In an embodiment, a method accesses a plurality of quality distributions associated with items in a corpus. Next, the method calculates a ranking of the items using the quality distributions, and determines error probabilities associated with the rankings Using the ranking error probabilities, a sequence of pairwise comparisons of items in the corpus is calculated and comparisons are provided to a comparison entity. A comparison result is used to update the quality distribution of the compared items in the pairwise comparison.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

System Architecture

Figure 1:
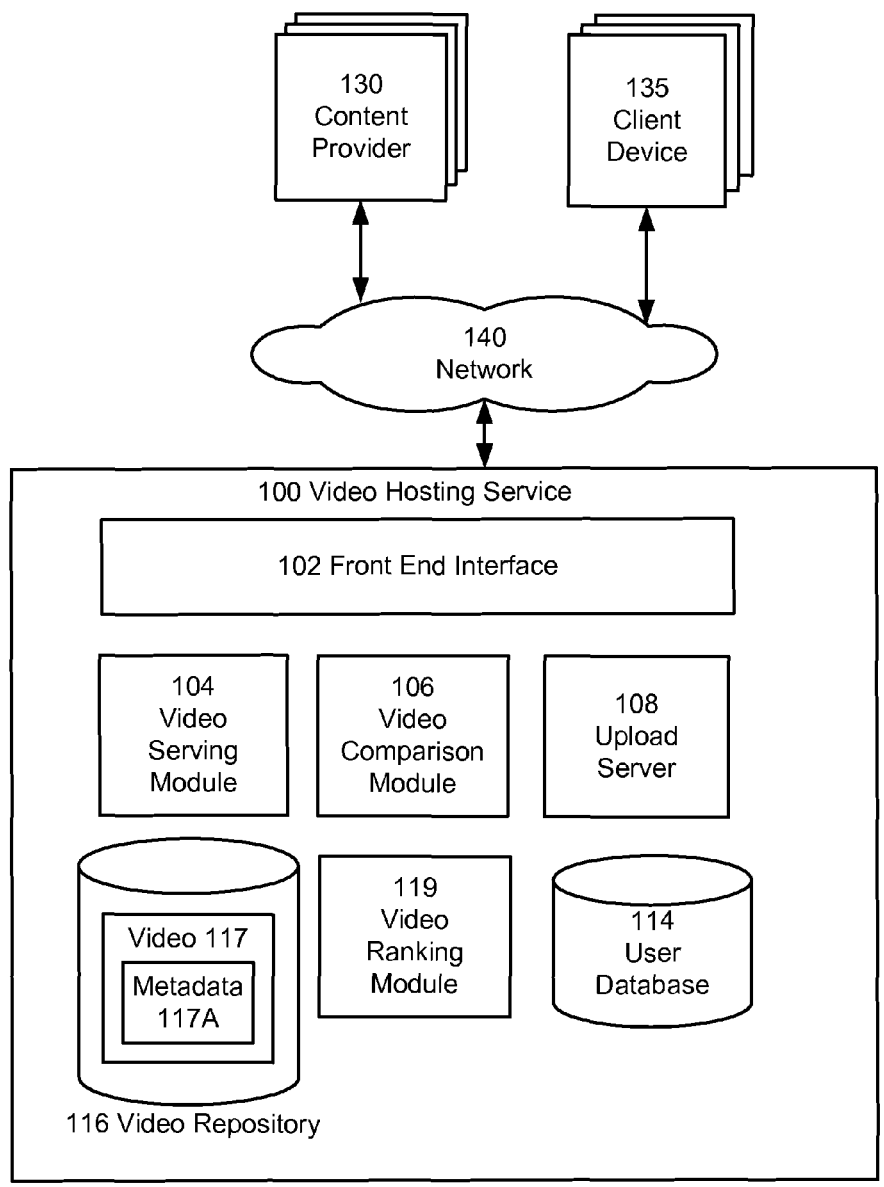
FIG. 1 is a block diagram of a video hosting service in which video ranking is used according to one embodiment.

FIG. 1 is a block diagram of a video hosting service 100 in which video ranking is used according to one embodiment. The video hosting service 100 represents a system such as that of YOUTUBE™ or GOOGLE VIDEOS™ that stores and provides videos to clients such as the client device 135. The video hosting site 100 communicates with a plurality of content providers 130 and client devices 135 via a network 140 to facilitate sharing of video content between users. The video hosting service 100 additionally includes a front end interface 102, a video serving module 104, a video comparison module 106, an upload server 108, a user database 114, and a video repository 116. Other conventional features, such as firewalls, load balancers, authentication servers, application servers, failover servers, site management tools, and so forth are not shown so as to more clearly illustrate the features of the video hosting site 100. One example of a suitable site 100 is the YOUTUBE™ website, found at www.youtube.com. Other video hosting sites can be adapted to operate according to the teachings disclosed herein. The illustrated components of the video hosting website 100 can be implemented as single or multiple components of software or hardware. In general, functions described in one embodiment as being performed by one component can also be performed by other components in other embodiments, or by a combination of components. Furthermore, functions described in one embodiment as being performed by components of the video hosting website 100 can also be performed by one or more client devices 135 in other embodiments if appropriate.

Client devices 135 (or more simply herein, "clients 135") are computing devices that execute client software, e.g., a web browser or built-in client application, to connect to the front end interface 102 of the video hosting service 100 via a network 140 and to display videos. The client device 135 might be, for example, a personal computer, a personal digital assistant, a cellular, mobile, or smart phone, or a laptop computer, digital television, digital set-top box, or the like.

The network 140 is typically the Internet, but may be any network, including but not limited to a LAN, a MAN, a WAN, a mobile wired or wireless network, a private network, or a virtual private network.

Conceptually, the content provider 130 provides video content to the video hosting service 100, which in turns stores and then hosts the video content, and the client 135 views that content, typically receiving the video content in streaming format. In practice, a content provider may also be a content viewer (e.g., viewers who generate content and upload it to the video hosting service 100). Additionally, a content provider 130 may be the same entity that operates the video hosting site 100.

A content provider 130 operates a computer system configured to perform various content provider functions; the computer system may be operated by a client 135 as well. Content provider functions may include, for example, uploading a video file to the video hosting website 100, editing a video file stored by the video hosting website 100, or editing content provider preferences associated with a video file. The video hosting website 100 exposes various application programming interfaces, as well as client tools (e.g., Java or HTML5 based video editor), to support this functionality.

A client 135 is used to view video content stored by the video hosting site 100. Clients 135 may also be used to configure viewer preferences related to video content, accessing these preferences on the video hosting website 100 through provided user interfaces. In some embodiments, the client 135 includes an embedded video player such as, for example, the FLASH player from Adobe Systems, Inc. or any other player adapted for the video file formats used in the video hosting website 100. Note that the terms "client" and "content provider" as used herein refer the particular apparatus resulting from the execution of software (providing respective client and content functionality) by general purpose hardware on which the software executes. It is further understood that the various operations and methods described herein are necessarily performed by one or more of these devices, and cannot be performed simply in the human mind.

The upload server 108 of the video hosting service 100 receives video content from a client device 135 or a content provider 130. Received content is stored in the video repository 116. In response to requests from a client 135, a video serving module 104 provides video data from the video repository 116 to the client. Clients 135 may also search for videos of interest stored in the video repository 116 such as by entering textual queries containing keywords of interest. Front end interface 102 provides the interface between client 135 and the various components of the video hosting site 100.

In some embodiments, the user database 114 is responsible for maintaining a record of registered users of the video hosting server 100. Registered users include content providers 130 as well as users who simply view videos on the video hosting website 100. Each content provider 130 and/or individual user registers account information including login name, electronic mail (e-mail) address and password with the video hosting server 100, and is provided with a unique user ID. This account information is stored in the user database 114. In one embodiment, the user account also includes privacy settings associated with the user account. The privacy settings allow a user to control the amount of data retained by the system about the user, such as the user's video viewing history and other actions performed by the user on the video repository. The privacy settings allow the user to opt out of data collection by the video hosting website 100.

The video repository 116 contains a set of videos 117 submitted by content providers and other users. The video repository 116 can contain any number of videos 117, such as tens of thousands or hundreds of millions. Each of the videos 117 has a unique video identifier that distinguishes it from each of the other videos, such as a textual name (e.g., the string "a91 qrx8"), an integer, or any other way of uniquely naming a video. The videos 117 can be packaged in various containers such as AV1, MP4, or MOV, and can be encoded using video codecs such as MPEG-2, MPEG-4, WebM, WMV, H.263, and the like. In addition to their audiovisual content, the videos 117 further have associated metadata 117A, e.g., textual metadata such as a title, description, and/or tags.

The video hosting service 100 further comprises a video ranking module 119 that ranks the videos according to particular categories. For example, the video ranking module 119 can use various types of information (e.g., server logs, user interactions) to rank videos in various categories, such as "dance," "music," or with respect to various keywords such as "cute" or "funny" or "scary." In this embodiment, the rankings are derived using the results of comparisons made by users of videos selected for comparison by the video comparison module 106. More specifically, the video comparison module 106 provides a pair of videos for a user of a client 135 to view and to select one of the two videos as the preferred video, given to the video category or keyword(s). This form of comparison is called a pairwise comparison. For example the video comparison module 106 may provide two videos to be ranked in the "dance" category to the user and receive a selection from the user as to the preferred video from the pair. The selection of which two videos from the video repository 116 are included in any particular pair of videos is determined by the video ranking module 119.

The comparison of videos by users necessarily has a cost to the user, in terms of the time spent, in reviewing the video and in determining which video is the preferred video. Similarly, there is a cost to the video hosting website 100 in terms of consumption of bandwidth and computing power for selecting and serving the comparisons. Further, where there are a large number of videos to be ranked, it is typically desirable to identify some number of highest ranked videos, without necessarily ranking all the videos that may be potential candidates. For example, while there may be 100,000 videos that are associated with the category "comedy," it is generally desirable to find the top 100 videos, since these are the highest quality videos; the particular rank order of the remaining videos (and certainly the bottom 50,000) is of little practical interest or use. Finally, it is desirable to schedule the selection of the comparisons so as to obtain the final ranking using the fewest number of comparisons for any given level of confidence in the ranking.

Accordingly, the video ranking module 119 selectively provides pairs of videos to the users so as to minimize the number of comparisons necessary to obtain a final ranking with a given level of confidence. This approach has the benefit of obtaining the final ranking more quickly (i.e., fewer comparisons) than other selection methods (e.g., random selection), and thus reduces the consumption of resources of both the video hosting website 100 and of the users. Another way of understanding the approach is that it maximizes the information value of each user's vote, by iteratively using the results of the comparisons to determine which videos to include in subsequent comparisons.

In one embodiment, the videos to be ranked in a particular category are selected by users, for example in a contest to identify the "best" videos in the category. The video ranking module 119 is now described in greater detail.

Video Ranking Module

Figure 2:
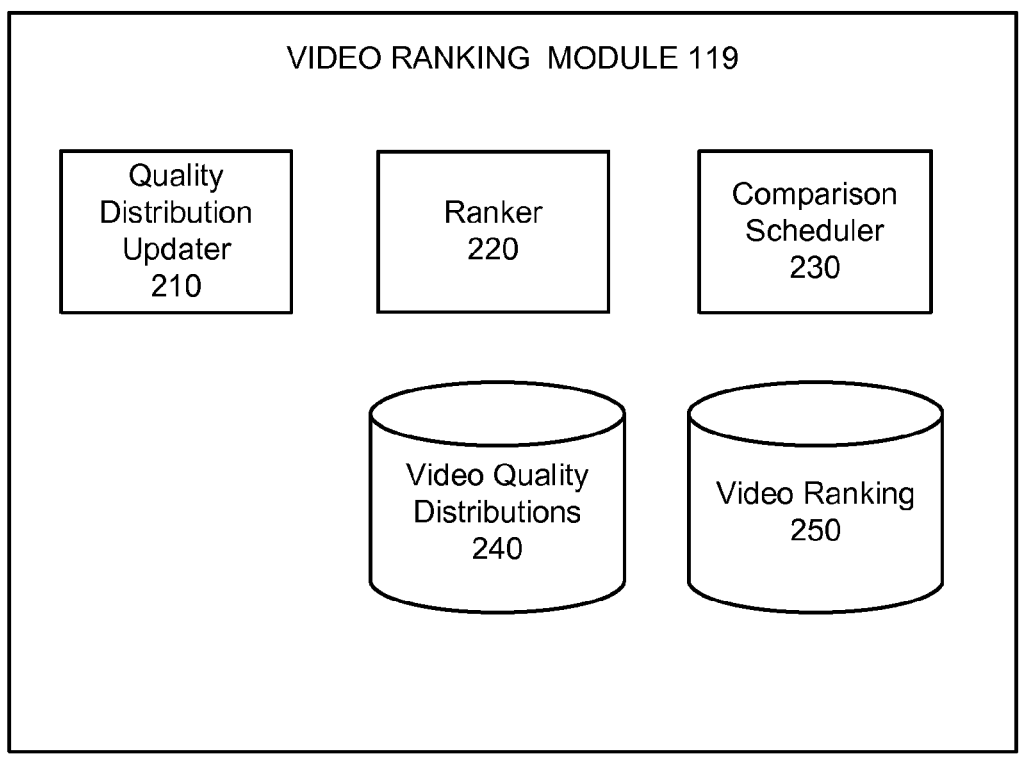
FIG. 2 illustrates the various components of a video ranking module according to an embodiment.

FIG. 2 illustrates the various components of the video ranking module 119 according to an embodiment. Conceptually, the video ranking module 119 manages the ranking data associated with the videos, ranks the videos, and selects video pairs to include in each pairwise comparison. The video ranking module 119 includes a quality distribution updater 210, a ranker 220, and a comparison scheduler 230. The video ranking module 119 also maintains a record of video quality distributions 240 and a video ranking 250.

The video quality distributions 240 are records of a quality distribution of each video modeled by a histogram or equivalent data structure for storing distributional data. Each video is associated with a corresponding quality distribution 240. The quality of each video is not treated as a static number, rather the histogram allows the quality of each video to be represented as the probability that the video belongs to a particular quality level. Since the histograms represent probabilities, the sum of the bins of the histogram equal one.

The quality distribution updater 210 updates the video quality distributions 240 associated with two videos, when a comparison of the two videos has been made by a user. The quality distribution updater 210 receives a comparison result made by a user from the video comparison module 106, which indicates which videos were compared and which video was preferred. For example, a comparison result can be represent by the tuple (i, j), indicating that two videos, i and j where compared, and the user selected i as the preferred video. The video selected by the user as the preferred video is also called the "winning" video, and the video which is not selected is also called the "losing" video. The quality distribution updater 210 modifies the histograms associated with each video using the current iteration of its corresponding video quality distribution.

For each video i, the histogram is represented as $f_i(x)$, where x is a bin of the histogram ranging from 0 to n. The cumulative distribution C of the histogram is defined as $C_i(x) = \sum_{i=0}^{x} f_i(x)$. The quality distributions after a comparison are modified for a winning video i and a losing video j according to the following equations:

$$\forall x \in [0,n] \rightarrow f_i(x) := f_i(x) C_j(x) \qquad \text{Eq. (1)}$$

$$\forall x \in [0,n] \rightarrow f_j(x) := f_j(x)(1 - C_i(x)) \qquad \text{Eq. (2)}$$

As shown in Eq. 1, each of the winning video's histogram bins is set to their prior value multiplied by the cumulative distribution of the losing video's histogram bins. As shown in Eq. 2, each of the losing video's histogram bins is set to their prior value multiplied by the inverse of the cumulative distribution of the winning video's histogram bins. After updating, these equations are normalized to ensure the cumulative probabilities equal 1. In this way the quality distribution updater 210 modifies the video quality distributions 240 as a result of a video comparison. This update is preferably performed by the quality distribution updater 210 after each pairwise comparison.

Using the video quality distributions 240 for all videos, the ranker 220 computes a video ranking 250. The video ranking 250 is computed using a sorting methodology and using the quality distributions to determine rank order. To determine which of a first video $V_1$ and a second video $V_2$ is ranked higher, the probability $P(V_1, V_2)$ that the $V_1$ ranks higher than the second video $V_2$ is calculated using equation 3:

$$P(V_1, V_2) = \sum_{x=0}^{n} f_1(x) C_2(x) \qquad \text{Eq. 3}$$

As shown in Eq. 3, the probability that $V_i$ ranks higher than $V_2$ is the sum over the range of histogram bins of $V_i$'s histogram bin multiplied by the cumulative distribution of $V_2$'s histogram. Thus, the calculated probability $P(V_1, V_k)$ is determined for pairs of videos $V_1$, $V_k$. Using a sorting algorithm, pairs of videos can be compared and sorted to determine a ranking Other methods of comparing the videos can also be used in other embodiments, such as by using the mean, median, mode, or other calculation on the quality distribution. Alternatively, if the videos have previously been directly compared by a user or plurality of users with sufficient confidence, the previous comparisons can be used.

The comparison scheduler 230 selects video pairs (i, j) to be compared in a pairwise comparison. Each selected pair is provided to user by the video hosting website 100 to review the videos and select a one of the videos as the winning video. The scheduler 230 selects videos in order to improve the expected return on the user's comparison. That is, because there are a limited number of users who are making comparisons, the videos selected for a given comparison are selected as to maximize the information value of the user's ranking of the two videos. The information value here is represented by the quantity K. The information value is based on an expected cost analysis:

$$K(i,j) = E(i,j) P(i,j) \qquad \text{Eq. 4}$$

where E(i,j) is the cost factor, and P(i,j) is the expectation (probability) value. These values are now described.

To select a pair of videos for comparison which maximizes the information value obtaining from the user's ranking of the two videos (i.e., which video is the winner and which the loser), an expected cost function is used. The cost is based on the assumption that as between two videos, there is a "correct" ranking of the two videos that would result if all user selections were known at the given moment, that is, as between these two videos, which video is most preferred by the population of users. Thus, a cost of an incorrect ranking of a pair of videos is calculated. The cost is then adjusted by the probability of its occurrence.

Because it is more desirable to determine the ranking of the top items, the cost of an incorrect ranking is treated as greatest for the top ranked videos. That is, there is a high cost for an incorrect ranking between the first and second positions, a smaller cost in mistaking second and third, etc. This cost (or ranking error) E for any pair of videos i and j with rankings $R_i$ and $R_j$ is defined by:

$$E(i, j) = \left| \frac{1}{R_i} - \frac{1}{R_j} \right| \qquad \text{Eq. 5}$$

That is, the cost E is determined by the absolute value of the inverse of the rating of the video i minus the inverse of the rating of video j. Optionally, the ranking terms can be modified by an exponent to reduce or increase the rating error distribution across the rankings This equation indicates the cost of a potential user ranking of a given pair of videos i and j being incorrect.

The cost of an incorrect ranking is then adjusted by the probability that the ranking is incorrect, as set forth in Eq. 6:

$$K(i,j) = E(i,j) P(i,j) \qquad \text{Eq. 6}$$

That is, the information value K of comparing two items in the list is computed by multiplying the cost E that two items are in the wrong order by the probability that the losing item is in fact better than the winning item. For example, consider two items which are ranked highly, such as the top two videos in a given category. Because these are highly ranked items, there is a high cost E if the two items are incorrectly ranked, however, there may be a very low probability P of being mistakenly ranked based on the quality distributions of the items. Accordingly, the information value K may be relatively low, so that the scheduler need not provide this pair of videos to a user for a comparison. Instead, the scheduler may select for comparison another pair whose cost is lower but whose error probability is significantly higher, and therefore has a much higher information value K.

By computing the value K of a comparison within the videos, the comparison scheduler identifies the comparisons to be made by a user which will best reduce the likelihood of a ranking error cost. The value K can be computed for adjacent videos, among all possible videos, or can be computed for a range of videos around a video. As a result, the videos which have a broader quality distribution are more likely to be compared as these videos are relatively unknown in the actual rankings. This also allows new videos (presumably initialized to a broader distribution) to be compared with higher ranked videos to quickly determine if the new video is high quality, without needing a high number of user comparisons.

As an alternative to using the comparison value described above, the selection of videos to compare can also be scheduled in other ways. One method is to schedule comparisons for videos which have adjacent rankings. For example videos ranked 5 and 6, or videos ranked 23 and 24 would be compared rather than 5 and 7 or 22 and 24.

Another method for scheduling comparisons is to schedule adjacently ranked videos and adjust the comparison frequency for adjacently ranked videos according to the videos' ranking For example, videos 1 and 2 would be compared more frequently than videos 50 and 51.

A modification to the adjacent ranking scheduling method is to weigh comparison frequency using the spread of the quality distribution. A measure of the spread of the quality distribution for the videos is determined for each video, such as a standard deviation. The measure indicates the extent to which a quality distribution has been well-defined as a result of comparisons. For those videos with a higher measure of the quality spread, e.g. a high standard deviation, the actual quality of the video is not well known. As such, the comparisons for adjacently ranked videos are scheduled with a frequency emphasizing comparisons where at least one video in the ranking has a higher measure of quality distribution spread. In this way the videos whose quality is less-well known are more likely to be compared and the videos' true quality distribution can be more quickly determined.

Using these components, the video ranking module 119 determines the relative ranking of videos, updates the video quality distributions, and schedules video comparisons to improve the ranking of the videos.

Quality Distribution and Video Comparisons

Figure 3:
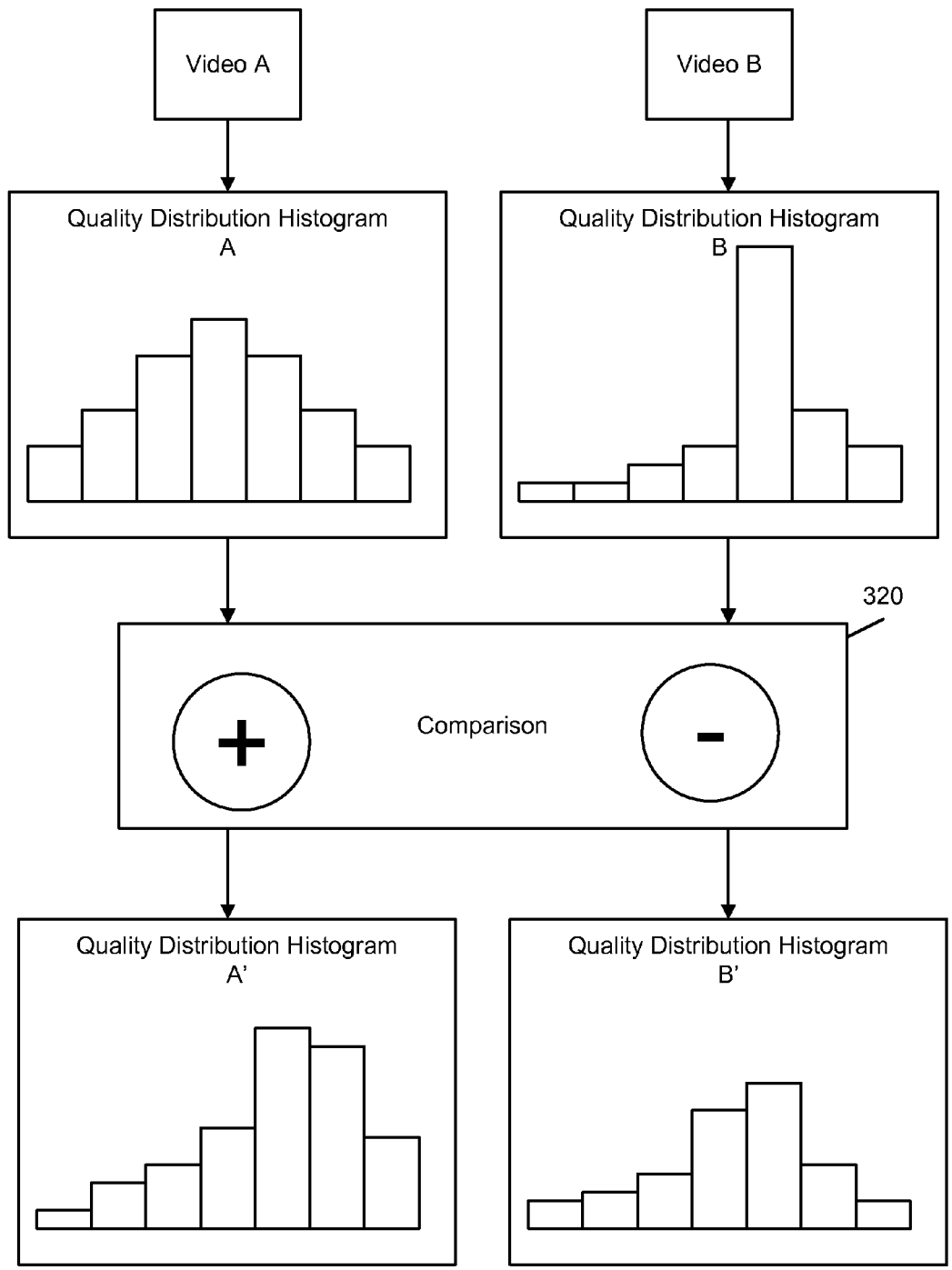
FIG. 3 shows a conceptual example of the quality distribution and effects of video comparisons according to one embodiment.

FIG. 3 shows an illustrative example of the quality distribution and effects of video comparisons according to one embodiment. Given two videos, video A and video B, each has a corresponding quality distribution histogram, each bin reflecting the likelihood the video is the quality associated with the bin. As shown by histogram A and histogram B, the quality distribution histograms vary in shape and distribution. Histogram A is broadly distributed and does not strongly indicate any particular quality level of video A. As a result, the actual quality of video A is not well-defined. Histogram B is more narrowly distributed and shows video B is more likely to be an above average video, but unlikely to be exceptional or below average.

These videos are compared by a user, and the result of the user's comparison 320 is that video A is selected by the user as being preferred over video B with respect to some qualitative feature; that is video A is the "winner." The quality distribution histograms A, B are updated to reflect the results of the comparison and provide updated quality distribution histogram A', B'. The updating is performed using the update function above. As a result of the updating, the quality distribution histogram A' reflects that video A which was not expected to win has been selected over the expected winner. Since the video that it beat was a known above-average quality, the likelihood that video A is low quality is now reduced. Similarly, the quality distribution histogram B' is not significantly changed, since the prior quality distribution B was very likely to be an above average video. The loss of video B against a video with a relatively wide quality distribution does increases the likelihood that video B is a lower quality video, but the distribution is not changed as significantly as the quality distribution of video A.

In one embodiment, the quality distribution may be modified without a comparison to other videos. For example, the video quality distribution may degenerate into a single histogram bin, or, if represented by a Gaussian distribution, may have a standard deviation approaching zero. In these cases, the distribution may be adjusted without a comparison to other videos to prevent the video from achieving a degenerate quality distribution. This may be accomplished by increasing the histogram bins of adjacent bins to the degenerate single histogram bin, or by increasing the standard distribution of a Gaussian distribution. This ensures the quality distribution of the videos remains flexible and subject to change.

Comparison Scheduling and Optimization

Figure 4:
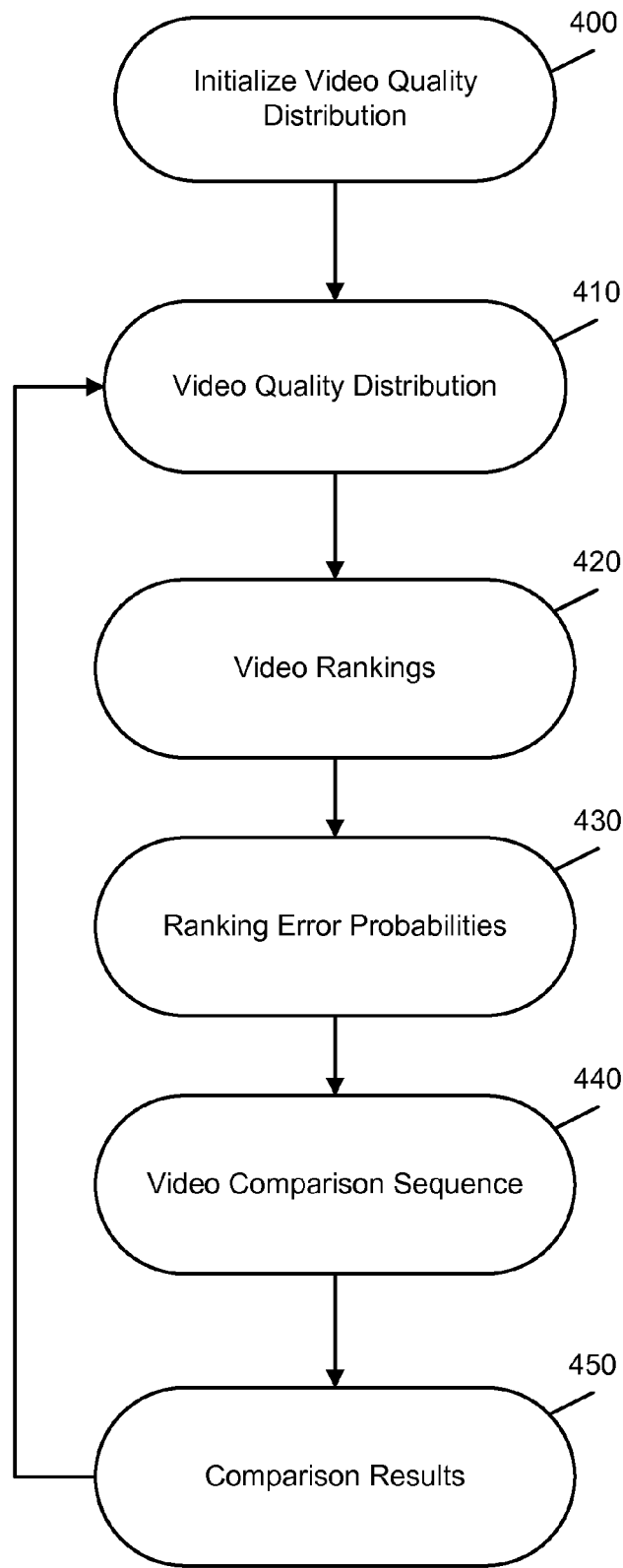
FIG. 4 provides a conceptual flow of data objects in the video ranking module 119.

FIG. 4 illustrates a flow diagram of data objects in the video ranking module 119. Initially, each new video is initialized 400 with a video quality distribution. The video quality distribution can be initialized 400 as a curve around a mean (e.g., a Gaussian distribution) or may be initialized to be equally probable to be any quality level. The initialized quality distribution for the new video can be added to the video quality distribution 410. Using the video quality distribution 410 and a ranking methodology as described above, the videos are ranked to form video rankings 420.

Next, the video rankings are used to determine the error cost E and the ranking error probabilities P (430) as described above. The error cost is used to determine the information value K for each pair of videos of a comparison. The information values K are used to schedule a video comparison sequence 440. The video scheduling is selected to increase the information in the system as a whole by selecting videos to compare with higher information values K. Serving the comparison to a user and receiving a comparison result 450 will yield an update to the quality distributions 410 as a result of the comparison. Since the comparison changes the quality distributions the rankings and the information values of the videos will change as videos are compared. As a result, the video scheduling order is recalculated periodically in view of the comparisons.

The video comparison sequence can be determined for the system as a whole, or may be determined on a per-user basis. That is, individual users may be provided the same sequence of videos to rate, or individual users may be served pairs of videos from a central sequence of videos.

User Confidence Quality Updating

Though treated above as a single binary comparison above, the determination of whether a video is better than another video is not typically an objective measure. The votes of users for the "better" video with respect to any particular category often provide a noisy data set. Many users will have differing views on which video should win a comparison. In addition, some users may intentionally seek to distort the results of the contest. Moreover, some users may be better arbiters of the rank than other users. That is, some users may more frequently and more consistently vote similarly to other users, and therefore are more trustworthy in their comparisons.

With these issues in mind, the video update equations for winning video i and losing video j in one embodiment includes a modifier a:

$$\forall x \in [0,n] \rightarrow f_i(x) := \alpha(f_i(x) C_j(x)) + (1-\alpha) f_i(x) \qquad \text{Eq. 7}$$

$$\forall x \in [0,n] \rightarrow f_j(x) := \alpha(f_j(x)(1-C_i(x))) + (1-\alpha) f_j(x) \qquad \text{Eq. 8}$$

The modifier $\alpha$ is used to determine the trustworthiness or "strength" of the comparison result and can range from zero to one. This modifier a can be a constant, or it can vary on a per-user basis; that is, each user is associated with a trustworthiness value, and as such, when the user provides a ranking of two videos, the updates to the videos quality histograms for the two videos are scaled by the user's trustworthiness. In this fashion, users who are determined to not be trustworthy only modestly influence the quality histograms. Over time, the per-user variable can change. More specifically, a user's trustworthiness can be incrementally increased each time the user's ranking of a pair of item coincides with an expected ranking (e.g., the most likely ranking of the items). For example, new users may be provided several comparisons with an "expected" winner having a very high known quality, and the user's modifier is adjusted according to the user's judgment in relation to popular opinion. In addition, the modifier can change on a per-comparison basis. For example, a user may provide a response to a pair of videos in a time frame shorter than the time to review the videos. This suggests the viewer failed to view the videos or failed to view the videos to completion. As a result, the rating provided by the comparison relative to that video pair is treated with reduced confidence by adjusting the modifier $\alpha$ (possibly to 0).

Ranking Classifier

In one embodiment, given a set of videos which have been ranked, the system can identify the placement of a new video in the ranking using the new video's similarity to the videos which have been ranked. Alternatively, the system can identify an initial quality distribution for the new video. To identify the new video's ranking or initial quality distribution, features of the new video can be compared to features of the other videos using machine learning techniques.

To initialize the machine learning techniques, initially a set of videos is selected to use as a positive and negative training sets. The selection of videos into each set can be performed using a threshold rank, such as selecting the top third and bottom third of the ranked videos. From the selected videos, features are extracted from the videos for training by a classifier.

The features extracted in one embodiment are visual low-level frame-based features. For example, one embodiment uses a color histogram and one embodiment uses histogram of oriented gradients to extract features from frames in a video, though other frame-based features can be used. The features extracted are collected on a per-frame basis and could comprise other frame-based features such as an identified number of faces or a histogram of oriented optical flow, and may comprise a combination of extracted features. Further features are extracted in other embodiments, such as a Laplacian-of-Gaussian (LoG) or Scale Invariant Feature Transform (SIFT) feature extractor, a color histogram computed using hue and saturation in HSV color space, motion rigidity features, texture features, filter responses (e.g. derived from Gabor wavelets), including 3D filter responses, edge features using edges detected by a Canny edge detector, gradient location and orientation histogram (GLOH), local energy-based shape histogram (LESH), or speeded-up robust features (SURF). Additional audio features can also be used, such as volume, an audio spectrogram, or a stabilized auditory image. In order to reduce the dimensionality of these features while maintaining the discriminating aspects, the features are reduced. The feature reduction is performed in one embodiment using a learned linear projection using principal component analysis to reduce the dimensionality of the feature vectors to 50, or some other suitable number less than 100. Other embodiments can use additional techniques to reduce the number of dimensions in the feature vectors.

In addition to the video and audio features of the videos, the feature vector of each video also includes the quality distribution and the ranking of the video. Using the positive and negative training sets, a classifier learns the features associated with the videos in the positive training set. In this way, a classifier is developed to identify the features and quality distributions characteristic of highly-ranked videos.

The classifier is next used to assist in initializing the quality distribution of newly-added videos. The frame and audio features are extracted from the newly-added video, and the classifier is used to analyze the newly-added video and determine a quality distribution for the new video. For example, a new video may be identified to have similar features to the videos in the first-third of the ranked videos, and the quality distribution can be initialized for that video higher on the histogram range. As a result, the initial quality distributions can be determined to more closely resemble the quality distributions of the existing well-ranked videos. Assuming the video actually is a higher quality video, the classification reduces the number of votes required to determine the proper ranking of the newly-added video.

Intra-Category Weighing

In an embodiment, the comparison scheduler can also be weighted to preferentially select pairwise comparisons within a subgenre of video. Within a given type of video, such as "dance," it is difficult for users to fairly compare two different types of dance videos. After identifying highly ranked videos for each type of dance video, the goal may still be to identify the "best" dance video, such that a comparison is ultimately made between various genres.

The different video subgenres can be determined in a variety of ways. One method is to identify subgenres based on keywords associated with each video. Keywords can be associated with each video using keywords uploaded with the video. Further sources of keywords include comments made by other users about a video. The keywords can be compared against a defined vocabulary for each of the subgenres, or the keywords may be clustered to determine groups of videos associated with similar keywords.

The videos may also be placed into subgenres using manual methods. When a video is uploaded by a user, the user may be prompted to select a subgenre associated with the video. Alternatively, a video's subgenre can be determined by a system operator of the video hosting service. The video subgenres may also be determined with user input, such as by providing users who are making a comparison an opportunity to select a subgenre.

Another method for selecting video subgenres is identifying features from the videos and determining groupings of videos using these features. The features can be extracted from the videos using the methods as described above to create a feature vector. Next, the feature vectors for videos can be grouped together. These groupings can be performed, for example, using a clustering methodology to identify latent similarities between the features vectors of the various videos. The clusters can be used to identify subgenres for the videos. Each latent cluster of video features is treated as a distinct subgenre, though there may not be any express information about the video indicating the videos actually belong to the distinct subgenres.

After identifying various subgenres, comparisons within the subgenre can be performed to enable users to compare videos for each subgenre. To enable users to make similar-type comparisons, within a "dance" genre, the comparison scheduler preferentially compares one hip-hop video to another hip-hop video, rather than compare a hip-hop video to a ballroom dance video. In particular, the comparison of similar types of videos may be more important within the lower and medium-quality rankings.

Encouraging comparisons between videos of similar subgenres can be performed in several ways. One method is to provide two rankings for each video; one ranking among the videos of the genre as a whole, and one ranking among the videos within the subgenre. Comparisons across subgenres can be thresholded such that no comparisons are made across subgenres unless one of the videos has ranked higher than the threshold in that subgenre. For example, a threshold can be placed at the fifth-ranked video in the subgenre, at which point the video would be eligible to be compared with other videos from other genres Alternative Applications Though described in this specification as relating to videos, a system incorporating a distribution update module, a ranker, and a scheduler are not limited to videos and may be employed by other systems. For example, these techniques can be used for any system using pairwise comparisons between items, which comparisons reveal latent qualities between the items. For example, the techniques could be used to schedule individuals to compete in competitions, such as chess, or to select articles for inclusion in a publication.

In one embodiment, a ranker 220 is used to rank search result items. The user selection of a particular item relative to other items can indicate a preference of the user for one item relative to the other items, and the quality distribution for the items is adjusted accordingly. For example, assume a user searches for a set of search results, relevant to a search term. A typical search returns a set of search pages with a number of search results which places the highest ranked results on the first page. However, users may find items of interest on second and subsequent pages. Using these ranking, the selection of an item from a second page of search results can be interpreted as being mildly preferential to the other items on the second page, but can be interpreted as strongly preferential to the items on the first page. The "mild" and "strong" preferences can be quantified by adjusting $\alpha$ in Equations 6 and 7.

The present disclosure has been described in particular detail with respect to one or more embodiments. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present disclosure is intended to be illustrative, but not limiting, of the scope of the disclosure, which is set forth in the following claims.

What is claimed is:

1. A computer-implemented method comprising:
   accessing a plurality of videos, each of the plurality of videos associated with a quality distribution, the quality distribution indicating probabilities that the video belongs to particular quality levels based at least in part on historical user input designating a preferred video from a pairwise comparison of two videos;
   determining a ranking of the plurality of videos, based in part on the quality distribution of each of the videos;

calculating a plurality of costs for video pairwise comparisons, based at least in part on an expected cost of incorrect rankings and a probability of the incorrect rankings;

receiving a request for a pair of videos to compare from a requestor;

selecting a video comparison based at least in part on the costs for video pairwise comparisons for video comparisons;

providing the selected video comparison to the requestor;

receiving a comparison result relative to a pair of videos; and updating the quality distribution associated with each video of the pair of videos to reflect the comparison result.

2. The computer-implemented method of claim 1, wherein the updating is performed using a modifier to increase or decrease the change to the quality distribution.

3. The computer-implemented method of claim 2, wherein the modifier is based at least in part on an entity performing the selected video comparison.

4. The computer-implemented method of claim 3, wherein the modifier is adjusted for each entity based at least in part on a history of the entity's conformance with an expected result of a plurality of previous pairwise comparisons.

5. The computer-implemented method of claim 1, wherein the cost of mistaken rankings is determined by an absolute value of an inverse of a ratings of a first video minus an inverse of the rating of the second video.

6. A computer-implemented method comprising:

accessing a plurality of quality distributions, each quality distribution associated with an video of a plurality of videos in a corpus, wherein the quality distribution represents probabilities of the quality of the video with respect to other videos in the corpus;

calculating a ranking of the videos in the corpus based on the plurality of quality distributions;

determining a plurality of ranking error probabilities associated with rankings of the videos;

calculating a sequence of pairwise comparisons of the plurality of videos in the corpus, each pairwise comparison comprising a pair of videos selected from the corpus, the sequence of pairwise comparisons based at least in part on the plurality of ranking error probabilities;

providing a comparison from the sequence of comparisons to a comparing entity;

receiving a comparison result from the comparing entity, the comparison result designating a selected video of the pairwise comparison and an unselected video of the pairwise comparison; and updating the quality distributions of the plurality of quality distributions that are associated with the selected video of the pairwise comparison and the unselected video of the responsive to the comparison, wherein the updating increases the quality distribution of the selected video and reduces the quality distribution of the unselected video.

7. The computer-implemented method of claim 6, wherein the quality distributions are probability histograms.

8. The computer-implemented method of claim 6, wherein the sequence for comparisons is calculated is further based on a cost of a ranking error associated with each pairwise comparison.

9. A system comprising:

a processor configured to execute instructions; and a non-volatile memory storing instructions for execution on the processor, the instructions, when executed by the processor, causing the processor to:

access a plurality of videos, each of the plurality of videos associated with a quality distribution, the quality distribution indicating probabilities that the video belongs to particular quality levels based at least in part on historical user input designating a preferred video from a pairwise comparison of two videos;

determine a ranking of the plurality of videos, based in part on the quality distribution of each of the videos;

calculate a plurality of costs for video pairwise comparisons, based at least in part on an expected cost of incorrect rankings and a probability of the incorrect rankings;

receive a request for a pair of videos to compare from a requestor;

select a video comparison based at least in part on the costs for video pairwise comparisons for video comparisons;

provide the selected video comparison to the requestor;

receive a comparison result relative to a pair of videos; and update the quality distribution associated with each video of the pair of videos to reflect the comparison result.

10. The system of claim 9, wherein the updating is performed using a modifier to increase or decrease the change to the quality distribution.

11. The system of claim 10, wherein the modifier is based at least in part on an entity performing the selected video comparison.

12. The system of claim 11, wherein the modifier is adjusted for each entity based at least in part on a history of the entity's conformance with an expected result of a plurality of previous pairwise comparisons.

13. The system of claim 9, wherein the cost of mistaken rankings is determined by an absolute value of an inverse of a ratings of a first video minus an inverse of the rating of the second video.

14. A non-transitory computer-readable medium comprising instructions that when executed by a processor cause the processor to:

access a plurality of videos, each of the plurality of videos associated with a quality distribution, the quality distribution indicating probabilities that the video belongs to particular quality levels based at least in part on historical user input designating a preferred video from a pairwise comparison of two videos;

determine a ranking of the plurality of videos, based in part on the quality distribution of each of the videos;

calculate a plurality of costs for video pairwise comparisons, based at least in part on an expected cost of incorrect rankings and a probability of the incorrect rankings;

receive a request for a pair of videos to compare from a requestor;

select a video comparison based at least in part on the costs for video pairwise comparisons for video comparisons;

provide the selected video comparison to the requestor and receive a comparison result relative to a pair of videos; and update the quality distribution associated with each video of the pair of videos to reflect the comparison result.

15. The non-transitory computer-readable medium of claim 14, wherein the updating is performed using a modifier to increase or decrease the change to the quality distribution.

16. The non-transitory computer-readable medium of claim 15, wherein the modifier is based at least in part on an entity performing the selected video comparison.

17. The non-transitory computer-readable medium of claim 16, wherein the modifier is adjusted for each entity based at least in part on a history of the entity's conformance with an expected result of a plurality of previous pairwise comparisons.

18. The non-transitory computer-readable medium of claim 14, wherein the cost of mistaken rankings is determined by an absolute value of an inverse of a ratings of a first video minus an inverse of the rating of the second video.

* * * * *